E. D. NORTON.
Mill Sieve.
No. 55,890.
Patented June 26, 1866.
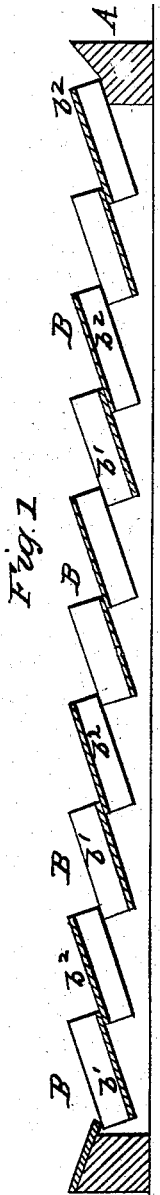
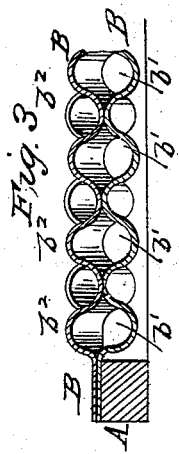
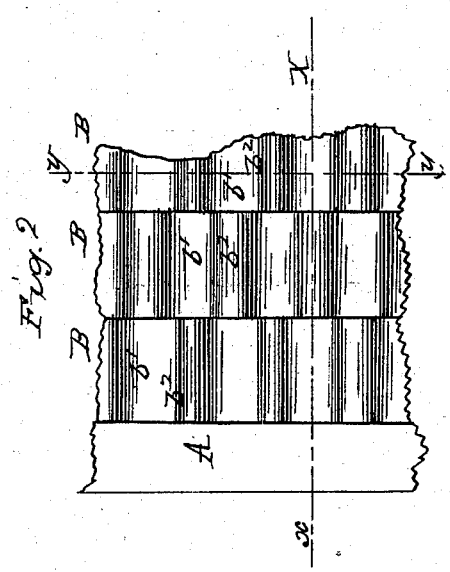

UNITED STATES PATENT OFFICE.

E. D. NORTON, OF BRADFORD, PENNSYLVANIA.

IMPROVEMENT IN MILL-SIEVES.

Specification forming part of Letters Patent No. 55,890, dated June 26, 1866.

*To all whom it may concern:*

Be it known that I, E. D. NORTON, of Bradford, McKean county, and State of Pennsylvania, have invented a new and useful Improvement in Fan-Mill Sieves; and I do hereby declare that the following is a full, clear, and exact description thereof, which will enable others skilled in the art to make and use the same, reference being had to the accompanying drawings, forming part of this specification, in which—

Figure 1 is a longitudinal section of my improved sieve, taken through the line $x\,x$, Fig. 2. Fig. 2 is a top view of a part of the same. Fig. 3 is a cross-section of a part of the same, taken through the line $y\,y$, Fig. 2.

Similar letters of reference indicate like parts.

My invention has for its object to guard against the possibility of the straw and coarse material working down through the screen or upper sieve and clogging the sieves; and it consists of an improved screen or upper sieve for a fan-mill formed of strips of corrugated sheet metal, said strips being attached at their ends to the sides of the frame of the sieve in such a way that the front edge of one strip shall overlap the rear edge of the next strip, the concavities of the corrugations of the one strip being placed above the convexities of the corrugations of the other.

A is the frame of the sieve, which is made of wood in the ordinary manner. The body of the screen or sieve is made of narrow strips B of sheet metal, corrugated crosswise with alternate concave and convex corrugations $b'\,b^2$. These corrugations may be circular, as shown in the drawings, or they may be of any other desired form. The ends of these strips are nailed or otherwise securely attached to the side pieces of the frame A of the sieve. The forward edge of each strip B is made to overlap the rear edge of the next adjacent strip, as shown in Fig. 1; and they are so arranged that the concavities $b'$ of the one strip shall be in the same vertical plane with the convexities $b^2$ of the next strip, as shown in Figs. 2 and 3, said strips B being soldered or otherwise securely attached to each other at their points of contact. The surface of the sieve is thus composed of a series of short channels separated laterally by arched or inclined elevations, the discharging-mouth of each channel being beneath the next rear strip, as seen in Fig. 1.

By this construction the kernels of grain, as they separate from the straw, will slide down into the channels or concavities $b'$, and pass out at the discharging-mouths of the channels toward or against the blast, while the straw and coarser material will slide along upon the convexities $b^2$ of the strips, the tendency of the blast being to lift the straw up from the surface of the sieve, shake the kernels of grain from it, and increase the rapidity of its movement toward the tail of the mill.

I claim as new and desire to secure by Letters Patent—

An improved screen or upper sieve for a fan-mill formed of strips B of corrugated sheet metal attached at their ends to the side bars of the frame A of the sieve, and so arranged that the forward edge of each strip B shall overlap the rear edge of the adjacent strip, and that the concavities $b'$ of each strip shall be in the same vertical plane with the convexities $b^2$ of the adjacent strips, substantially as herein described, and for the purposes set forth.

E. D. NORTON.

Witnesses:
T. J. MELVIN,
DARIUS FRANK.